(12) United States Patent
Hedlund et al.

(10) Patent No.: US 9,167,445 B2
(45) Date of Patent: Oct. 20, 2015

(54) SYSTEMS AND METHODS FOR MEASURING AVAILABLE BANDWIDTH IN MOBILE TELECOMMUNICATIONS NETWORKS

(71) Applicant: Ascom Network Testing AB, Skelleftea (SE)

(72) Inventors: Anders Hedlund, Skellefteå (SE); David Degerfeldt, Skellefteå (SE)

(73) Assignee: Ascom Network Testing AB, Skellefteå (SE)

( * ) Notice: Subject to any disclaimer, the term of this patent is extended or adjusted under 35 U.S.C. 154(b) by 94 days.

(21) Appl. No.: 13/753,964

(22) Filed: Jan. 30, 2013

(65) Prior Publication Data

US 2014/0056158 A1 Feb. 27, 2014

Related U.S. Application Data

(60) Provisional application No. 61/692,748, filed on Aug. 24, 2012, provisional application No. 61/751,358, filed on Jan. 11, 2013.

(51) Int. Cl.
*H04W 24/00* (2009.01)
*H04W 24/02* (2009.01)
*H04W 4/00* (2009.01)
(Continued)

(52) U.S. Cl.
CPC ............ *H04W 24/02* (2013.01); *H04L 41/0823* (2013.01); *H04L 43/0852* (2013.01); *H04L 43/0876* (2013.01); *H04L 43/0882* (2013.01); *H04L 43/10* (2013.01); *H04L 43/106* (2013.01); *H04L 43/16* (2013.01); *H04L 47/12* (2013.01); *H04L 47/30* (2013.01); *H04L 47/365* (2013.01); *H04W 4/00* (2013.01); *H04W 24/00* (2013.01); *H04W 24/08* (2013.01); *H04W 28/0236* (2013.01); *H04W 72/00* (2013.01); *H04L 43/0888* (2013.01); *H04L 47/14* (2013.01)

(58) Field of Classification Search
None
See application file for complete search history.

(56) References Cited

U.S. PATENT DOCUMENTS 6,359,901 B1 3/2002 Todd et al.
6,363,477 B1 3/2002 Fletcher et al.
(Continued)

FOREIGN PATENT DOCUMENTS

EP 1335525 8/2003
EP 1455490 A2 9/2004
(Continued)

OTHER PUBLICATIONS

Borms, Joris et al, "Low-Overhead Dynamic Multi-channel MAC for Wireless Sensor Networks", (Feb. 17, 2010) Wireless Sensor Networks, Springer Berlin Heidelberg, Berlin, Heidelberg, pp. 81-96.
(Continued)

*Primary Examiner* — Hassan Phillips
*Assistant Examiner* — Ayanah George
(74) *Attorney, Agent, or Firm* — Womble Carlyle

(57) ABSTRACT

A network device receives probe packets communicated by a user equipment device. The network device communicates response packets back to the user equipment device, including timestamps, and/or other information. The user equipment device may be configured to test the performance of different portions of a wireless network (i.e., determine an available bandwidth measurement throughput (ABMT) of the wireless network) by accessing different network devices (or information associated with different network devices).

18 Claims, 18 Drawing Sheets

(51) Int. Cl.
  *H04W 72/00* (2009.01)
  *H04L 12/24* (2006.01)
  *H04W 24/08* (2009.01)
  *H04L 12/801* (2013.01)
  *H04L 12/835* (2013.01)
  *H04W 28/02* (2009.01)
  *H04L 12/805* (2013.01)
  *H04L 12/26* (2006.01)

(56) References Cited

U.S. PATENT DOCUMENTS

| | | |
|---|---|---|
| 7,310,529 B1 * | 12/2007 | Lodge et al. .............. 455/445 |
| 7,656,838 B2 | 2/2010 | Fauconnier et al. |
| 7,933,557 B1 | 4/2011 | Townley et al. |
| 7,974,195 B2 | 7/2011 | Jin et al. |
| 8,094,575 B1 | 1/2012 | Vadlakonda et al. |
| 8,437,264 B1 | 5/2013 | Go |
| 2002/0093917 A1 | 7/2002 | Knobbe et al. |
| 2002/0105911 A1 | 8/2002 | Pruthi et al. |
| 2003/0076840 A1 * | 4/2003 | Rajagopal et al. ....... 370/395.21 |
| 2003/0145100 A1 * | 7/2003 | Marchetto et al. ........... 709/233 |
| 2004/0181573 A1 | 9/2004 | Cao et al. |
| 2004/0218617 A1 | 11/2004 | Sagfors |
| 2005/0111487 A1 | 5/2005 | Matta et al. |
| 2006/0045023 A1 | 3/2006 | Kim et al. |
| 2006/0126509 A1 | 6/2006 | Abi-Nassif et al. |
| 2006/0233118 A1 | 10/2006 | Funk et al. |
| 2006/0262759 A1 | 11/2006 | Bahl et al. |
| 2007/0195797 A1 | 8/2007 | Patel et al. |
| 2008/0019278 A1 | 1/2008 | Niemczyk et al. |
| 2008/0095193 A1 | 4/2008 | Gaedke et al. |
| 2008/0253301 A1 * | 10/2008 | Keromytis et al. ........... 370/252 |
| 2009/0185599 A1 | 7/2009 | Chari |
| 2009/0190613 A1 | 7/2009 | Finn |
| 2009/0245186 A1 | 10/2009 | Klein et al. |
| 2010/0054244 A1 | 3/2010 | Tamura |
| 2010/0110922 A1 | 5/2010 | Ketheesan et al. |
| 2010/0121972 A1 | 5/2010 | Samuels et al. |
| 2010/0165863 A1 | 7/2010 | Nakata |
| 2010/0238821 A1 | 9/2010 | Liu et al. |
| 2011/0051607 A1 | 3/2011 | Begen |
| 2011/0222431 A1 | 9/2011 | Oue et al. |
| 2012/0128000 A1 | 5/2012 | Baillargeon et al. |
| 2012/0140861 A1 | 6/2012 | Menon et al. |
| 2012/0257686 A1 * | 10/2012 | Scholand ..................... 375/295 |
| 2012/0307661 A1 * | 12/2012 | Oshiba ......................... 370/252 |
| 2013/0058248 A1 | 3/2013 | Singh et al. |

FOREIGN PATENT DOCUMENTS

| | | |
|---|---|---|
| EP | 2071770 A1 | 6/2009 |
| EP | 2136588 A1 | 12/2009 |
| EP | 2477357 | 7/2012 |
| WO | WO 00/13442 | 3/2000 |

OTHER PUBLICATIONS

Chen, Kuan-Ta, et al "The Impact of Network Variabilities on TCP Clocking Schemes", INFOCOM 2006. 25th IEEE International Conference on Computer Communications Proceedings, IEEE, Piscataway, NJ, Apr. 23, 2006, pp. 1-6.

International Search Report and Written Opinion dated Apr. 7, 2014 issued in PCT counterpart application (No. PCT/IB2013/002567).

International Preliminary Report on Patentability (IPRP) dated Dec. 3, 2014 issued in PCT counterpart application (PCT/IB2013/002567).

\* cited by examiner

IP STACK
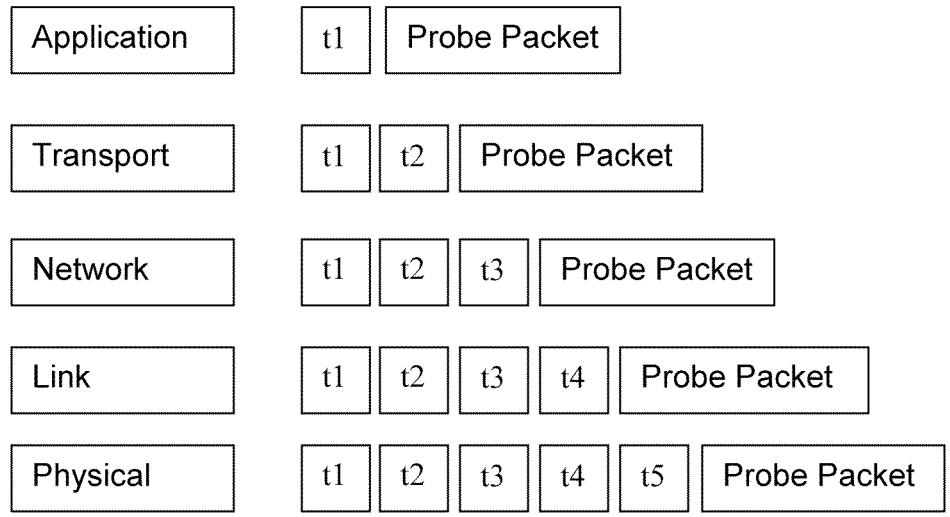
Time-stamps during transmission
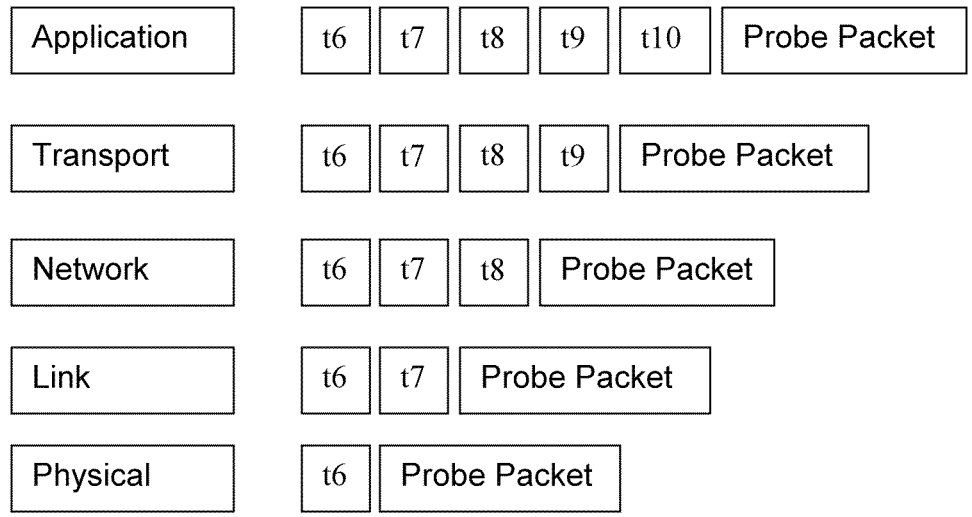
Time-stamps during reception
FIG. 4

One packet train

| | Packets per train | IP Packet Size |
|---|---|---|
| Trains per second | 2 | |
| LTE | 58 | 1500 |
| HSPA | 30 | 1500 |
| R99 | 15 | 150 |
| GPRS | 10 | 80 |
| EGPRS | 15 | 80 |
| CDMA | 20 | 500 |
| EVDO | 20 | 150 |
| WiFi | 30 | 1500 |

FIG. 9

| System | LTE 20MHz 2TB UE Category 3 (DL) | LTE 20MHz 2TB UE Category 3 (UL) | LTE 5MHz 1TB (DL) | LTE 5MHz 1TB (UL) |
|---|---|---|---|---|
| Bits per TTI | 102048 | 51024 | 18336 | 18336 |
| TTI per second | 1000 | 1000 | 1000 | 1000 |
| Link capacity (physical layer) (bit/s) | 102048000 | 51024000 | 18336000 | 18336000 |
| Link capacity (app layer) (bit/s) | 95134458.37 | 47567229.18 | 17093773.8 | 17093773.8 |
| Packets per train | 58 | 58 | 58 | 58 |
| Bits per train | 696000 | 696000 | 696000 | 696000 |
| Overhead (%) | 7.26712671 | 7.26712671 | 7.26712671 | 7.26712671 |
| Physical layer load per train (bits) | 746579.2019 | 746579.2019 | 746579.2019 | 746579.2019 |
| Physical layer load (kbit/s) | 1493.158404 | 1493.158404 | 1493.158404 | 1493.158404 |
| Intrusiveness (%) | 1.463192227 | 2.926384454 | 8.143315902 | 8.143315902 |
| TTI's per train + 1 | 9 | 16 | 42 | 42 |
| TTI's per train (ceiled) | 8 | 15 | 41 | 41 |
| TTI's per train -1 | 7 | 14 | 40 | 40 |
| ABM throughput | 87000000 | 46400000 | 16975609.76 | 16975609.76 |
| ABM error (%) | -8.550485812 | -2.453851533 | -0.691269487 | -0.691269487 |
| ABM throughput (max) | 99428571.43 | 49714285.71 | 17400000 | 17400000 |
| ABM error (%) (max) | 4.5137305 | 4.5137305 | 1.791448776 | 1.791448776 |

FIG. 10A

| System | LTE 10MHz 1TB (DL) | LTE 10MHz 1TB (UL) | LTE 10MHz 2TB (DL) | LTE 10MHz 2TB (UL) |
|---|---|---|---|---|
| Bits per TTI | 36696 | 36696 | 73392 | 36696 |
| TTI per second | 1000 | 1000 | 1000 | 1000 |
| Link capacity (physical layer) (bit/s) | 36696000 | 36696000 | 73392000 | 36696000 |
| Link capacity (app layer) (bit/s) | 34209921.65 | 34209921.65 | 68419843.29 | 34209921.65 |
| Packets per train | 58 | 58 | 58 | 58 |
| Bits per train | 696000 | 696000 | 696000 | 696000 |
| Overhead (%) | 7.26712671 | 7.26712671 | 7.26712671 | 7.26712671 |
| Physical layer load per train (bits) | 746579.2019 | 746579.2019 | 746579.2019 | 746579.2019 |
| Physical layer load (kbit/s) | 1493.158404 | 1493.158404 | 1493.158404 | 1493.158404 |
| Intrusiveness (%) | 4.068994996 | 4.068994996 | 2.034497498 | 4.068994996 |
| TTI's per train + 1 | 22 | 22 | 12 | 22 |
| TTI's per train (ceiled) | 21 | 21 | 11 | 21 |
| TTI's per train -1 | 20 | 20 | 10 | 20 |
| ABM throughput | 33142857.14 | 33142857.14 | 63272727.27 | 33142857.14 |
| ABM error (%) | -3.119166757 | 3.119166757 | -7.522840995 | -3.119166757 |
| ABM throughput (max) | 34800000 | 34800000 | 69600000 | 34800000 |
| ABM error (%) (max) | 1.724874905 | 1.724874905 | 1.724874905 | 1.724874905 |

FIG. 10B

| System | HSPA 64QAM + (DC or MIMO) –(DL) | HSPA 64QAM + (DC or MIMO) – (UL) | HSPA 64QAM (DL) | HSPA 64QAM (UL) |
|---|---|---|---|---|
| Bits per TTI | 84384 | 22996 | 42192 | 11848 |
| TTI per second | 500 | 500 | 500 | 500 |
| Link capacity (physical layer) (bit/s) | 42192000 | 11498000 | 21096000 | 5924000 |
| Link capacity (app layer) (bit/s) | 39333578.98 | 10719034.2 | 19666789.49 | 5522661.212 |
| Packets per train | 30 | 30 | 30 | 30 |
| Bits per train | 360000 | 360000 | 360000 | 360000 |
| Overhead (%) | 7.26712671 | 7.26712671 | 7.26712671 | 7.26712671 |
| Physical layer load per train (bits) | 386161.6562 | 386161.6562 | 386161.6562 | 386161.6562 |
| Physical layer load (kbit/s) | 772.3233123 | 772.3233123 | 772.3233123 | 772.3233123 |
| Intrusiveness (%) | 1.830497043 | 6.717023068 | 3.660994086 | 13.03719298 |
| TTI's per train + 1 | 6 | 18 | 11 | 34 |
| TTI's per train (ceiled) | 5 | 17 | 10 | 33 |
| TTI's per train -1 | 4 | 16 | 9 | 32 |
| ABM throughput | 36000000 | 10588235.29 | 18000000 | 5454545.455 |
| ABM error (%) | -8.475147858 | -1.220249006 | -8.475147858 | -1.233386492 |
| ABM throughput (max) | 45000000 | 11250000 | 20000000 | 5625000 |
| ABM error (%) (max) | 14.40606518 | 4.953485432 | 1.694280158 | 1.85307018 |

FIG. 10C

| System | HSPA noMIMO 16QAM 15 codes (DL) | HSPA noMIMO 16QAM 15 codes (UL) | HSPA noMIMO 16QAM 10 codes (DL) | HSPA noMIMO 16QAM 10 codes –(UL) (10ms) |
|---|---|---|---|---|
| Bits per TTI | 27952 | 5772 | 14411 | 20000 |
| TTI per second | 500 | 500 | 500 | 100 |
| Link capacity (physical layer) (bit/s) | 13976000 | 2886000 | 7205500 | 2000000 |
| Link capacity (app layer) (bit/s) | 13029154.81 | 2690479.449 | 6717342.229 | 1864504.123 |
| Packets per train | 30 | 30 | 30 | 30 |
| Bits per train | 360000 | 360000 | 360000 | 360000 |
| Overhead (%) | 7.26712671 | 7.26712671 | 7.26712671 | 7.26712671 |
| Physical layer load per train (bits) | 386161.6562 | 386161.6562 | 386161.6562 | 386161.6562 |
| Physical layer load (kbit/s) | 772.3233123 | 772.3233123 | 772.3233123 | 772.3233123 |
| Intrusiveness (%) | 5.526068348 | 26.76102953 | 10.71852491 | 38.61616562 |
| TTI's per train + 1 | 15 | 68 | 28 | 21 |
| TTI's per train (ceiled) | 14 | 67 | 27 | 20 |
| TTI's per train -1 | 13 | 66 | 26 | 19 |
| ABM throughput | 12857142.86 | 2685567.164 | 6666666.667 | 1800000 |
| ABM error (%) | -1.320208072 | -0.145412191 | -0.754398991 | -3.459585961 |
| ABM throughput (max) | 13846153.85 | 2727272.727 | 6923076.923 | 1894736.842 |
| ABM error (%) (max) | 6.270545154 | 1.367536109 | 3.062739509 | 1.621488463 |

FIG. 10D

| System | R99 (DL) | R99 (UL) | GPRS (DL) * | GPRS (UL) * | EGPRS (DL) * | EGPRS (UL) * |
|---|---|---|---|---|---|---|
| Bits per TTI | 3840 | 640 | 1600 | 400 | 4736 | 1184 |
| TTI per second | 100 | 100 | 50 | 50 | 50 | 50 |
| Link capacity (physical layer) (bit/s) | 384000 | 64000 | 80000 | 20000 | 236800 | 59200 |
| Link capacity (app layer) (bit/s) | 357984.8 | 59664.13 | 74580.16 | 18645.04 | 220757.3 | 55189.32 |
| Packets per train | 15 | 15 | 10 | 10 | 15 | 15 |
| Bits per train | 18000 | 18000 | 6400 | 6400 | 9600 | 9600 |
| Overhead (%) | 7.267127 | 7.267127 | 7.267127 | 7.267127 | 7.267127 | -100 |
| Physical layer load per train (bits) | 19308.08 | 19308.08 | 6865.096 | 6865.096 | 10297.64 | 10297.64 |
| Physical layer load (kbit/s) | 38.61617 | 38.61617 | 13.73019 | 13.73019 | 20.59529 | 20.59529 |
| Intrusiveness (%) | 10.05629 | 60.33776 | 17.16274 | 68.65096 | 8.697335 | 34.78934 |
| TTI's per train + 1 | 7 | 32 | 6 | 19 | 4 | 10 |
| TTI's per train (ceiled) | 6 | 31 | 5 | 18 | 3 | 9 |
| TTI's per train -1 | 5 | 30 | 4 | 17 | 2 | 8 |
| ABM throughput | 300000 | 58064.52 | 64000 | 17777.78 | 160000 | 53333.33 |
| ABM error (%) | -16.1976 | -2.68103 | -14.1863 | -4.65144 | -27.5222 | -3.36295 |
| ABM throughput (max) | 360000 | 60000 | 80000 | 18823.53 | 240000 | 60000 |
| ABM error (%) (max) | 0.562931 | 0.562931 | 7.267127 | 0.957296 | 8.716682 | 8.716682 |

*assuming 4 slots for GPRS and EGPRS

FIG. 10E

| System | CDMA (DL) | CDMA (UL) | EVDO (DL) | EVDO (UL) | WiFi (DL) | WiFi (UL) |
|---|---|---|---|---|---|---|
| Bits per TTI | 20712 | 20712 | 4096 | 256 | 54000 | 1000 |
| TTI per second | 50 | 50 | 602.4096 | 602.4096 | 1000 | 1000 |
| Link capacity (physical layer) (bit/s) | 1035600 | 1035600 | 2467470 | 154216.9 | 54000000 | 1000000 |
| Link capacity (app layer) (bit/s) | 965440.2 | 965440.2 | 2300304 | 143769 | 50341611 | 932252.1 |
| Packets per train | 20 | 20 | 20 | 20 | 30 | 30 |
| Bits per train | 80000 | 80000 | 24000 | 24000 | 360000 | 360000 |
| Overhead (%) | 7.267127 | 7.267127 | 7.267127 | 7.267127 | 7.267127 | 7.267127 |
| Physical layer load per train (bits) | 85813.7 | 85813.7 | 25744.11 | 25744.11 | 386161.7 | 386161.7 |
| Physical layer load (kbit/s) | 171.6274 | 171.6274 | 51.48822 | 51.48822 | 772.3233 | 772.3233 |
| Intrusiveness (%) | 16.57275 | 16.57275 | 2.086681 | 33.38689 | 1.430228 | 77.23233 |
| TTI's per train + 1 | 6 | 6 | 8 | 102 | 9 | 388 |
| TTI's per train (ceiled) | 5 | 5 | 7 | 101 | 8 | 387 |
| TTI's per train -1 | 4 | 4 | 6 | 100 | 7 | 386 |
| ABM throughput | 800000 | 800000 | 2065404 | 143146.8 | 45000000 | 930232.6 |
| ABM error (%) | -17.1362 | -17.1362 | -10.2117 | -0.43274 | -10.6107 | -0.21663 |
| ABM throughput (max) | 1000000 | 1000000 | 2409639 | 144578.3 | 51428571 | 932642.5 |
| ABM error (%) (max) | 3.57969 | 3.57969 | 4.753053 | 0.562931 | 2.159168 | 0.04188 |

FIG. 10F

| Technology | # Packets in Packet Train | Level of Intrusiveness (%) (typical) (DL / UL) | ABM Maximum Error (%) |
|---|---|---|---|
| LTE, 20 MHz bandwidth, 2 TBs, Cat. 3 UE | 58 | 1.5% / 3.0% | 4.5% |
| LTE, 10 MHz bandwidth, 2 TBs | 58 | 2.0% / 4.0% | 1.7% |
| LTE, 10 MHz bandwidth, 1 TB | 58 | 4.1% / 4.1% | 1.7% |
| LTE, 5 MHz bandwidth, 1 TB | 58 | 8.2% / 8.2% | 1.8% |
| HSPA, 64QAM + (Dual Carrier or MIMO with 2 TB) | 30 | 1.8% / 6.7 % | 5% |
| HSPA, non-MIMO 16QAM 15 codes | 30 | 5.5% / 26 % | 6.2% |
| WCDMA Rel 99 | 15 | 10% / 60%* | 0.6% |
| EGPRS | 15 | 8.7% / 68%* | 8.7% |
| GPRS | 10 | 17% / 68%* | 7% |
| EV-DO | 20 | 2% / 33%* | 4.7% |
| CDMA (1x) | 20 | 16.5% / 16.5%* | 3.6% |
| Wi-Fi | 30 | 1.4% 1.4% | 2.1% |

*Much higher here, even if single packet is sent (because data transfer is so slow)

FIG. 11A

| | Level of intrusiveness (%) (typical) | Level of intrusiveness (%) (worst case) | Accuracy (%) (typical) | Accuracy (%) (worst case) |
|---|---|---|---|---|
| LTE | 2.034497498 | 8.143315902 | 98.27512509 | 95.4862695 |
| HSPA | 5.526068348 | 38.61616562 | 93.72945485 | 85.59393482 |
| R99 | 10.05629313 | 60.33775877 | 99.43706871 | 99.43706871 |
| GPRS | 17.16274027 | 68.65096109 | 99.04270427 | 92.73287329 |
| EGPRS | 8.697334598 | 34.78933839 | 91.28331752 | 91.28331752 |
| CDMA | 16.57275036 | 16.57275036 | 96.42031024 | 96.42031024 |
| EVDO | 2.086680824 | 33.38689319 | 99.43706871 | 95.24694657 |
| WiFi | 1.430228356 | 77.23233123 | 99.95812017 | 97.8408317 |

FIG. 11B

SYSTEMS AND METHODS FOR MEASURING AVAILABLE BANDWIDTH IN MOBILE TELECOMMUNICATIONS NETWORKS

CROSS-REFERENCE TO RELATED APPLICATIONS

This application claims priority to U.S. Provisional Patent Application Ser. No. 61/692,748 filed Aug. 24, 2012, and U.S. Provisional Patent Application Ser. No. 61/751,358 filed Jan. 11, 2013, which applications are hereby incorporated by reference herein in their entirety.

This application is related to: (1) U.S. patent application Ser. No. 13/753,900, entitled "Systems and Methods for Measuring Available Bandwidth in Mobile Telecommunications Networks"; (2) U.S. patent application Ser. No. 13/753,924, entitled "Systems and Methods for Measuring Available Bandwidth in Mobile Telecommunications Networks"; (3) U.S. patent application Ser. No. 13/753,933, entitled "Systems and Methods for Measuring Available Bandwidth in Mobile Telecommunications Networks"; (4) U.S. patent application Ser. No. 13/753,952, entitled "Systems and Methods for Measuring Available Bandwidth in Mobile Telecommunications Networks"; (5) U.S. patent application Ser. No. 13/753,973, entitled "Systems and Methods for Measuring Available Bandwidth in Mobile Telecommunications Networks"; and (6) U.S. patent application Ser. No. 13/753,985, entitled "Systems and Methods for Measuring Available Bandwidth in Mobile Telecommunications Networks". All aforementioned applications are being filed concurrently herewith and are hereby incorporated by reference in their entirety.

TECHNICAL FIELD

The present disclosure relates to the field of mobile telecommunications networks. More specifically, the present disclosure relates to available bandwidth measurements in mobile telecommunication networks.

BACKGROUND

The latest generations of mobile telecommunications systems, such as, but not limited to LTE, HSPA, and other mobile telecommunication systems, require new ways of testing and measuring the available bandwidth of such systems. Traditional methods of testing such systems utilized FTP file transfer protocols to download and upload files. However, in LTE and HSPA, the radio interface is a shared resource between all users in a cell. An FTP file transfer to one user in the cell (e.g., the testing equipment) significantly affects other users in the cell. Another challenge occurs when benchmarking different operators (i.e., carriers) that share the same radio access network.

Also, in LTE, with a category 3 user equipment or "UE" and a 20 MHz system bandwidth, transfer rates of 100 Mbit/sec can be reached. Even filling such bandwidth with data can be a challenge. Every part of the system from the server to the FTP client must be tuned to manage such transfer rates. Especially, a UE based application used for testing the performance can be expected to have problems generating all the data needed to fill the bit-pipe.

All in all, this sets the requirement on a new method for testing the available bandwidth. Algorithms exist for testing IP backbone networks such as pathChip, TOPP, SLoPS, etc., but these algorithms are designed for routers and bit-pipes that have a rather constant performance over time.

However, these algorithms do not accommodate a radio link with Rayleigh fading conditions varying, for example, on a millisecond basis, in combination with different MIMO configurations and a scheduler with very flexible and powerful mechanisms for maximum utilization of the radio path (both uplink and downlink).

Some conventional techniques employ "packet trains" to significantly lower an overall load of the bit-pipe, while still being capable of measuring the available bandwidth. According to these techniques, data packages are sent so that the bottleneck (i.e., maximum bandwidth or data transfer rate) of the bit-pipe between the server and the client is reached, keeping that load for a short time, neither overloading nor under-loading it, sampling the available bandwidth and then releasing the load until the next measurement is made (for example, one per second or other measurement rate), ultimately resulting in a reliable measurement of the available bandwidth.

However, these conventional systems still fail to accurately test and/or measure network performance in all environments and/or conditions.

BRIEF SUMMARY

Various systems, computer program products, and methods for measuring available bandwidth are described herein. Packet trains may be communicated between user equipment devices and network devices for the purposes of measuring available bandwidth in a wireless network.

A network device may receive probe packets communicated by a user equipment device. The network device may reflect the packets (as response packets) back to the user equipment device, including timestamps, and/or other information. The user equipment device may be configured to test the performance of different portions of the wireless network (i.e., determine an available bandwidth measurement throughput (ABMT) of the wireless network) by accessing different network devices (or information associated with different network devices).

BRIEF DESCRIPTION OF THE DRAWINGS

Aspects of the present disclosure are illustrated by way of example and are not limited by the accompanying figures with like references indicating like elements.

FIG. 4 illustrates time-stamping of packet at each layer of the IP stack, according to various aspects of the invention.

FIG. 9 illustrates a table describing traffic patterns for a number of different technologies, according to various aspects of the invention FIGS. 10A-10F illustrate tables depicting the traffic patterns and performance metrics associated with available bandwidth measurement (ABM) for different technologies, according to various aspects of the invention.

FIGS. 11A and 11B summarize the performance metrics of FIGS. 10A-10F, according to various aspects of the invention.

DETAILED DESCRIPTION

Figure 1:
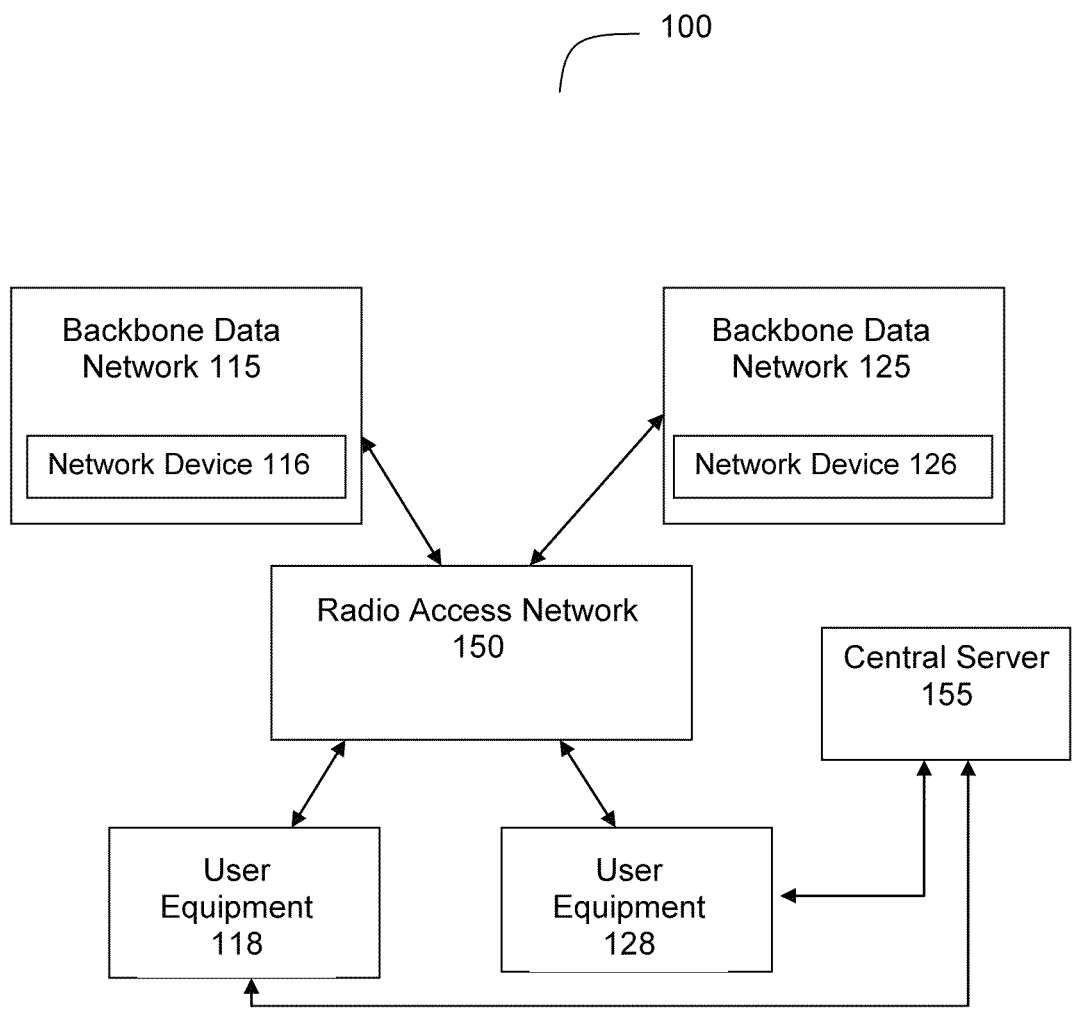
FIG. 1 illustrates a system for measuring available bandwidth, according to various aspects of the invention.

FIG. 1 illustrates an exemplary system 100 configured to measure available bandwidth in mobile telecommunication networks, according to various aspects of the invention. System 100 may comprise, among other things, a first backbone data network 115 associated with a first operator, a second backbone data network 125 associated with a second operator, and a radio access network 150. The first operator and the second operator may use their own backbone data networks 115 and 125, respectively, but may share a common radio access network 150. The first and second operator may share the same radio access network 150 using techniques such as Multi Operator Core Network (MOCN), and/or other techniques. Various implementations of the invention rely on a time-stamping protocol commonly known as Two-Way Active Measurement Protocol (TWAMP) though other time-stamping protocols may be used or implemented as would be appreciated.

First backbone data network 115 may comprise one or more network devices, for example, network device 116. Second backbone data network 125 may comprise one or more network devices, for example, network device 126. Network device 116/126 may comprise a server, router, switch, and/or other computing/processing device comprising one or more processors/microprocessors capable of performing various operations described herein. In some implementations, network device 116/126 may perform the functions of a reflector of the TWAMP protocol. In some implementations, the network device 116/126 includes a memory that may include one or more instructions stored on tangible computer readable media that when executed by the processors cause the processors to perform the functions of the network device 116/126.

First user equipment device 118 and second user equipment device 128 may be connected to radio access network 150. First user equipment device 118 and second user equipment device 128 may be any device used by an end-user to communicate within and/or through network 150 and may include a mobile phone, cellular phone, smart phone, laptop computer, and/or any other portable computing device. In some implementations, first user equipment device 118 may be associated with a first operator. In some implementations, second user equipment device 128 may be associated with a second operator. In some implementations, the user equipment device 118/128 may comprise a computing/processing device comprising one or more processors/microprocessors capable of performing various operations described herein. In some implementations, the user equipment device 118/128 may perform the functions of a controller of the TWAMP protocol. In some implementations, the user equipment device 118/128 includes a memory that may include one or more instructions stored on tangible computer readable media that when executed by the processors cause the processors to perform the functions of the user equipment device 118/128.

Figure 7:
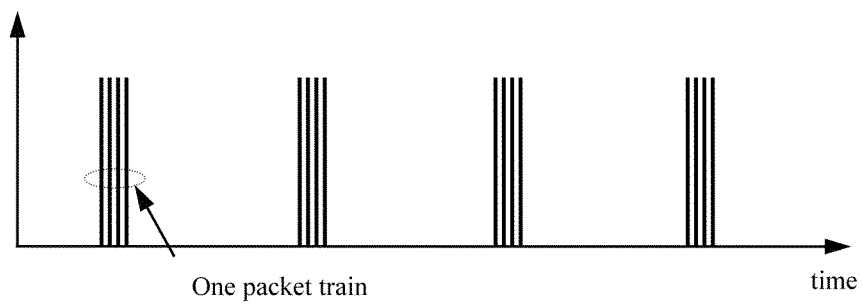
FIG. 7 illustrates a symbolic representation of packet trains, according to according to various aspects of the invention.

In some implementations, first user equipment device 118 may send a first packet train and second user equipment device 128 may send a second packet train. The first packet train may include a plurality of first probe/test packets. The second packet train may include a plurality of second probe/test packets. Each of the first probe packets and/or second probe packets may include a sequence number, timestamp, error estimate and/or packet padding. In some implementations, packet trains may be sent at regular intervals (for example, 0.5 second or other intervals) with pauses (i.e., no data) in between. A symbolic representation of the packet train is illustrated in FIG. 7, for example.

Synchronization of the load (i.e., first and second packet trains) from user equipment devices 118, 128 sharing the bit-pipe may significantly impact the measurement of available bandwidth. The bit-pipe may be defined as a link that carries data traffic (e.g., first and second packet trains). In some implementations, the bit-pipe may include a complete link all the way from user equipment device 118/128 to network device 116/126 (and/or back). In some implementations, the bit-pipe may include a portion of the complete link (for example, only the radio access network portion). A difference in measurement may be expected depending on whether the first packet train from the first operator and the second packet train from the second operator overlap with one another. For example, the first packet train and the second packet train may be fully synchronised (i.e., sent at the same time and fully overlapping), partly synchronised (i.e., sent with an offset less than the full duration of the packet train and partially overlapping) or completely un-synchronised (i.e., no overlap between the packet trains, either in time or frequency domain).

In some implementations, un-synchronized packet trains between/among various different operators (for example, the first operator and the second operator) may be used for purposes of measuring available bandwidth. In some implementations, un-synchronized packet trains from user equipment devices (for example, user equipment devices 118, 128) associated with different operators may be accomplished by controlling the user equipment devices via a central server 155 that distributes a transmission pattern between the user equipment devices.

In some implementations, central server 155 may include a standalone server that is configured to control user equipment devices 118, 128. In some implementations, central server 155 may communicate and/or control the user equipment device 118, 128 via USB (Universal Serial Bus). In some implementations, central server 155 may include a controller running inside user equipment device 118, 128. In some implementations, central server 155 may be part of the radio access network 150. In some implementations, central server 155 may be part of or communicate with backbone data network 115 and/or backbone data network 125. In some implementations, central server 155 may include a standalone server separate from the radio access network, backbone data network 115, and/or backbone data network 125.

In some implementations, central server 155 may generate a transmission pattern indicating when user equipment devices associated with the different operators would transmit associated packet trains. In some implementations, the transmission pattern may include a time for each user equipment device indicating when the user equipment device may transmit its associated packet train. For example, the central server 155 may generate a transmission pattern indicating that user equipment device 118 may transmit the first packet train starting at time T0 and that user equipment device 128 may transmit the second packet train starting at time T1. The times T0 and T1 may be such that the first and second packet trains would not collide or otherwise overlap with one another. In some implementations, the first and second probe packets associated with the first and second packet trains may be time-stamped based on the transmission pattern. In some implementations, the foremost probe packet of the plurality of first probe packets may be sent at time T0 (i.e., time-stamped T0) followed by the rest of the plurality of first probe packets. Similarly, the foremost probe packet of the plurality of second probe packets may be sent at time T1 (i.e., time-stamped T1) followed by the rest of the plurality of first probe packets.

In some implementations, central server 155 may transmit a transmission pattern to user equipment device 118 indicating that the device 118 start sending first packet trains at time T0 and the number of first packet trains to send (or frequency of first packet trains). For example, the transmission pattern may indicate that the user equipment 118 start sending 2 first packet trains per second. Based on the transmission pattern, user equipment device 118 may generate and transmit the 2 first packet trains per second. Each first packet train may take 10 ms to send. After 250 ms, central server 155 may transmit a transmission pattern to user equipment device 128 indicating the device 128 start sending its second packet trains at time T1 and the number of second packet trains to send (or frequency of second packet trains). For example, the transmission pattern may indicate that the user equipment 128 start sending 2 second packet trains per second. Based on the transmission pattern, user equipment device 128 may generate and transmit the 2 second packet trains per second. Each second packet train may take 10 ms to send. In other words, the packet trains from the two user equipment devices 118 and 128 are 250 ms apart (i.e., unsynchronized). This sync may be relatively rough, +−100 ms, but it is possible to determine on a millisecond basis (by the central server 155, for example) using information from the user equipment devices 118 and 128 exactly when the packet trains were sent over the radio link. In some implementations, the determination on a millisecond basis may be made by analyzing the resource allocation associated with the user equipment devices 118, 128. In some implementations, central server 155 may analyze, for each millisecond, which resources the user equipment device 118/128 is assigned. Using the known transmission pattern of a packet train makes it possible to match the packet train and resource allocation using the size (plus protocol overhead).

In some implementations, central server 155 may determine whether there is risk that the packet trains from the two user equipment devices 118 and 128 will overlap on the radio interface. In some implementations, in response to the determination that there is a risk, central server 155 may generate and transmit a time offset (for example 10 ms) to one or both of the user equipment devices 118, 128. If, for example, the time offset is provided to the user equipment device 118, device 118 may wait for 10 ms before sending its first packet trains.

In some implementations, the central server 155 may transmit/distribute the transmission pattern to various user equipment devices of the different operators. For example, central server 155 may transmit the transmission pattern to user equipment device 118 and user equipment device 128. In some implementations, the transmission pattern may be sent separately, as a separate packet, to each user equipment device. In some implementations, the transmission pattern may be piggybacked on another packet being communicated to the user equipment device. In some implementations, user equipment device 118 and user equipment device 128 may transmit first packet train and second packet train, respectively, based on the transmission pattern received from the central server 155.

In some implementations, the network devices may receive the un-synchronized first packet train and the second packet train. In some implementations, network device 116 may receive the first packet train from the user equipment device 118 and network device 126 may receive the second packet train from the user equipment device 128. In some implementations, network device 116/126 may respond to the sending user equipment device 118/128 by generating and transmitting a plurality of response packets. In some implementations, network device 116 may transmit a plurality of first response packets to user equipment device 118 in response to the plurality of first probe packets. In some implementations, network device 126 may transmit a plurality of second response packets to user equipment device 128 in response to the plurality of second probe packets. In some implementations, network device 116 may time-stamp each of the first response packets and network device 126 may time-stamp each of the second response packets. In some implementations, network device 116/126 may perform the functions of a typical TWAMP server (or reflector) that generates and time-stamps response packets, as would be appreciated.

In some implementations, central server 155, user equipment device 118, and/or other processing device (not otherwise illustrated in FIG. 1) may perform available bandwidth measurement based on the sent first probe packets and/or received first response packets associated with the first packet train. In some implementations, central server 155, user equipment device 128, and/or other processing device (not otherwise illustrated in FIG. 1) may perform available bandwidth measurement based on the sent second probe packets and/or received second response packets associated with the second packet train.

In some implementations, un-synchronized packet trains from user equipment devices associated with different operators may be accomplished by using a decentralized method where the user equipment devices apply different time offsets (e.g., offsets greater than the duration of the packet trains). For example, user equipment device 118 may apply a first time offset for transmission of the first packet train and user equipment device 128 may apply a second time offset (different from the first time offset) for transmission of the second packet train. In some implementations, the user equipment devices generate the packet trains such that the offset between the packet trains from the devices is large enough to not collide when reflected back (i.e. responded to in the form of response packets) from the corresponding network devices. In some implementations, the user equipment devices (e.g., first user equipment device 118 and second user equipment device 128) may apply the time offsets either randomly or by setting up a communication channel directly between each other (e.g. using Wi-Fi Bluetooth). In some implementations, the packet trains (e.g., first and second packet trains) do not collide or otherwise overlap with one another.

In some implementations, rather than or in addition to controlling the timing of the packets trains between/among the different network operators, measurement data may be analyzed (i.e., post processing) to remove or otherwise compensate for overlapping packet trains (in both time and frequency domain). In some implementations, network device 116 may receive first packet trains from user equipment device 118 and network device 126 may receive second packet trains from user equipment device 128 (regardless of whether they are synchronized, partly synchronized or un-synchronized). In some implementations, network device 116, 126 may transmit first response packets and second response packets to the user equipment devices 118, 128, respectively. In some implementations, user equipment device 118 may perform available bandwidth measurement based on the first probe packets sent to and first response packets received from (i.e., information associated with the first probe packets and first response packets) the network device 116. In some implementations, user equipment device 128 may perform available bandwidth measurement based on the second probe packets sent to and second response packets received from (i.e., information associated with the second probe packets and second response packets) the network device 126. In some implementations, the central server 155 (or other processing device) may communicate with the user equipment devices 118, 128 and perform available bandwidth measurement based on the sent probe packets and/or received response packets associated with the user equipment devices 118, 128.

In some implementations, user equipment device 118, 128 may communicate information (e.g., time stamps, packet transmission pattern, or other information) regarding the sent probe packets (sent based on the transmission pattern, for example) and received response packets to central server 155. In some implementations, central server 155 may make a determination regarding whether any packet trains overlap with another. In some implementations, in response to a determination that a packet train overlaps with another packet train, central server 155 may perform compensation for the overlapping packet trains. In some implementations, central server 155 may analyze the scheduling and resource allocation associated with the user equipment devices 118, 128 for purposes of performing the compensation. In some implementations, central server 155 may compare the resource allocation between the two user equipment devices 118, 128. In some implementations, central server 155 may determine the compensation for the overlapping packet trains based on the analysis. In some implementations, central server 155 may perform the available bandwidth measurement based on the information received from the user equipment device 118/128.

Figure 2:
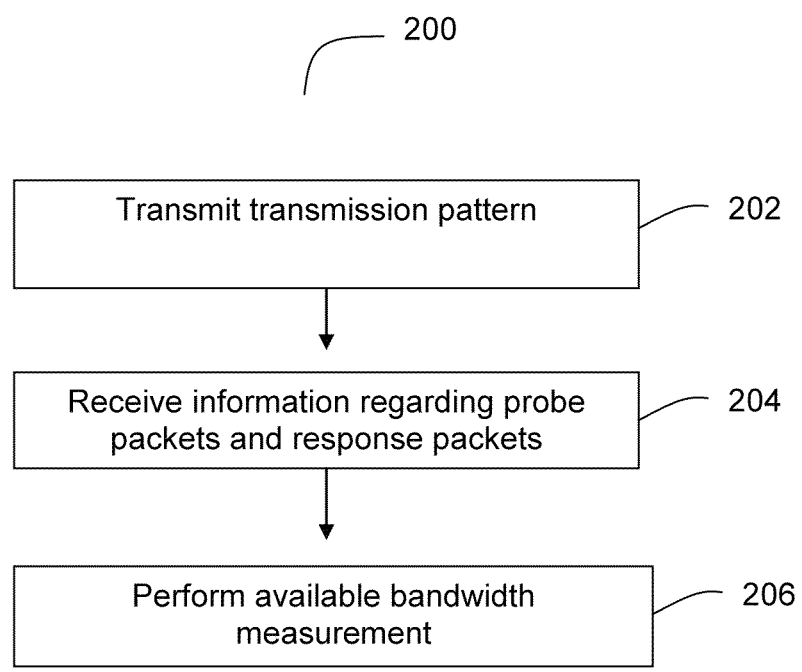
FIG. 2 illustrates a flowchart depicting example operations performed by a central server, according to various aspects of the invention.

FIG. 2 is a flowchart 200 depicting example operations performed by the central server 155, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 2. In yet other implementations, one or more operations may be performed simultaneously. In yet other implementations, one or more operations may not be performed. Accordingly, the operations described are exemplary in nature and, as such, should not be viewed as limiting.

In some implementations, in an operation 202, process 200 may transmit a transmission pattern to one or more user equipment devices associated with different operators. For example, process 200 may transmit a transmission pattern to first user equipment device 118 associated with a first operator and second user equipment device 128 associated with a second operator. In some implementations, the transmission pattern may include a time for each user equipment device indicating when the user equipment device may transmit its associated packet train such that a packet train transmitted by each user equipment device does not collide or otherwise overlap with one another.

In an operation 204, process 200 may receive, from each user equipment device, information regarding probe packets sent based on the transmission pattern and the response packets received in response to the probe packets. In some implementations, the first user equipment device 118 may transmit first probe packets associated with the first packet trains to network device 116 based on the transmission pattern and the second user equipment device 128 may transmit second probe packets associated with the second packet trains to network device 126 based on the transmission pattern such that the packet trains do not collide or otherwise overlap with one another (i.e., the packet trains are un-synchronized). In some implementations, user equipment device 118 may time-stamp each of the first probe packets and user equipment device 128 may time-stamp each of the second probe packets (transmission time-stamps).

In some implementations, network devices 116, 126 may respond to the un-synchronized packet trains. In some implementations, network device 116 may transmit a plurality of first response packets to user equipment device 118 in response to the plurality of first probe packets associated with the first packet train. In some implementations, network device 126 may transmit a plurality of second response packets to user equipment device 128 in response to the plurality of second probe packets associated with the second packet train. In some implementations, user equipment devices 118, 128 may receive the corresponding response packets. In some implementations, network device 116 may time-stamp each of the first response packets and network device 126 may time-stamp each of the second response packets. In some implementations, network devices 116, 126 may include the reception time-stamps in the response packets. In some implementations, user equipment devices 118, 128 may communicate information (e.g., time stamps or other information) regarding the sent probe packets and received response packets to central server 155.

In some implementations, central server 155 may perform available bandwidth measurements based on the received information, in an operation 206. In these implementations, the central server 155 and the user equipment device 118 and/or user equipment device 128 may have a common time reference.

Figure 3:
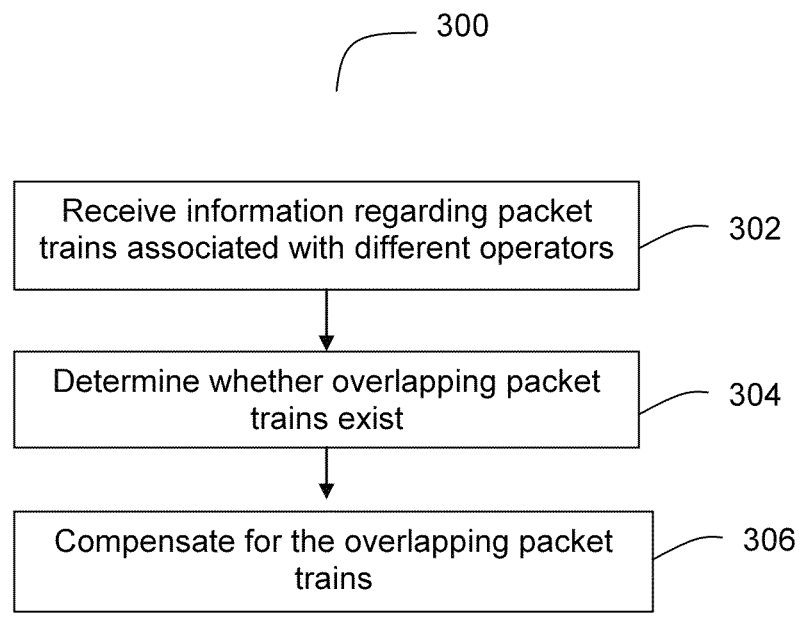
FIG. 3 illustrates a flowchart depicting example operations performed by a central server, according to various aspects of the invention.

FIG. 3 is a flowchart 300 depicting example operations performed by the central server 155, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 3. In yet other implementations, one or more operations may be performed simultaneously. In yet other implementations, one or more operations may not be performed. Accordingly, the operations described are exemplary in nature and, as such, should not be viewed as limiting.

In some implementations, in an operation 302, process 300 may receive information regarding at least two packet trains associated with different operators. In some implementations, process 300 may receive, from each user equipment device, information regarding probe packets sent based on the transmission pattern and the response packets received in response to the probe packets, as described above.

In an operation 304, process 300 may determine whether overlapping packet trains exist. In some implementations, process 300 may determine whether the first and second packet trains overlap. In some implementations, in an operation 306, process 300 may compensate for the overlapping packet trains. In some implementations, in response to a determination that the first and second packet trains overlap, process 300 may compensate for the overlapping first and second packet trains.

In some implementations, accuracy and reliability of time-stamps has an impact on the reliability of the available bandwidth measurements. In some implementations, performance of a network device, performance of the operating system, other applications sharing the device processor and bit-pipe as well as modem design may affect the measurements. Thus, for the purposes of bandwidth measurement, all performance factors/measurements but the packet trains need to be filtered out.

In some implementations, strain introduced in a user equipment device itself (for example, user equipment device 116, 126) may be determined by analyzing time-stamps on various protocol layers within the device (e.g., Java domain, IP stack, etc.) and comparing the respective time-stamps within each layer to those associated with the radio access network 150.

In some implementations, in depth probing of the user equipment device, including the modem chipset parts, as well as the protocol stack and each of the application layers may be performed. This may be accomplished by time-stamping each of the packets of the packet train at each of the various physical and application layers to determine where strain is introduced. For example, as illustrated in FIG. 4, each probe packet of a packet train may be time-stamped at the physical layer, the link layer, the network layer, the transport layer, and/or the application layer of the protocol stack during transmission by the user equipment device and during reception by the corresponding network device. In some implementations, each first probe packet may be time-stamped at each layer of the IP stack associated with user equipment device 118 as first probe packet traverses through the layers during transmission. In some implementations, each first probe packet may be time-stamped again at each protocol layer of the IP stack associated with the network device 116 as the first probe packet traverses through the protocol layers during reception. In some implementations, the first probe packet that is sent to the network device 116 by user equipment 118 may include the transmission time-stamps associated with each layer of the IP stack. In some implementations, the first response packet sent by the network device 116 to user equipment 118 in response to the first probe packet may include the reception time-stamps associated with each layer of the IP stack.

In some implementations, central server 155 may compare the time-stamps within each layer of the IP stack associated with the user equipment device 118 (added during transmission) to the time-stamps within each layer of the IP stack associated with the network device 116 (added during reception). For example, the time-stamps t5 and t6 associated with the physical layers may be compared to determine whether a strain is introduced at the physical layer level; the time-stamps t4 and t7 associated with the link layers may be compared to determine whether a strain is introduced at the link layer level; the time-stamps t3 and t8 associated with the network layers may be compared to determine whether a strain is introduced at the network layer level; the time-stamps t2 and t9 associated with the transport layers may be compared to determine whether a strain is introduced at the transport layer level; and/or the time-stamps t1 and t10 associated with the application layers may be compared to determine whether a strain is introduced at the application layer level.

For example, comparison of time stamps may indicate that a strain of "x" was introduced at the physical layer. The strain may not be larger than "x" in the protocol layers above the physical layer when the packet train travels through the protocol layers up to the application layer. This may indicate that the user equipment device itself has introduced the strain. Typically, different protocol layers of the protocol stack are handled by different processors in the user equipment device. For example, the lowest physical layer may be implemented in a DSP, the next three layers in a modem CPU and then the IP, TCP/UDP, and above layers in an application processor. The strain may thus indicate which of the device processors is overloaded.

Similarly, each second probe packet may be time-stamped at each layer of the IP stack associated with user equipment device 128 as second probe packet traverses through the layers during transmission. In some implementations, each second probe packet may be time-stamped again at each protocol layer of the IP stack associated with the network device 126 as the second probe packet traverses through the protocol layers during reception. In some implementations, central server 155 may compare the time-stamps within each layer of the IP stack associated with the user equipment device 128 to the time-stamps within each layer of the IP stack associated with the network device 126, in a similar manner as described above with respect to user equipment device 128.

Such time-stamping permits differentiation of strain introduced or caused by a user equipment device/network device versus that due to the bit-pipe. In some implementations of the invention, this time-stamping may also assist with device diagnostics as would be appreciated.

Figure 5:
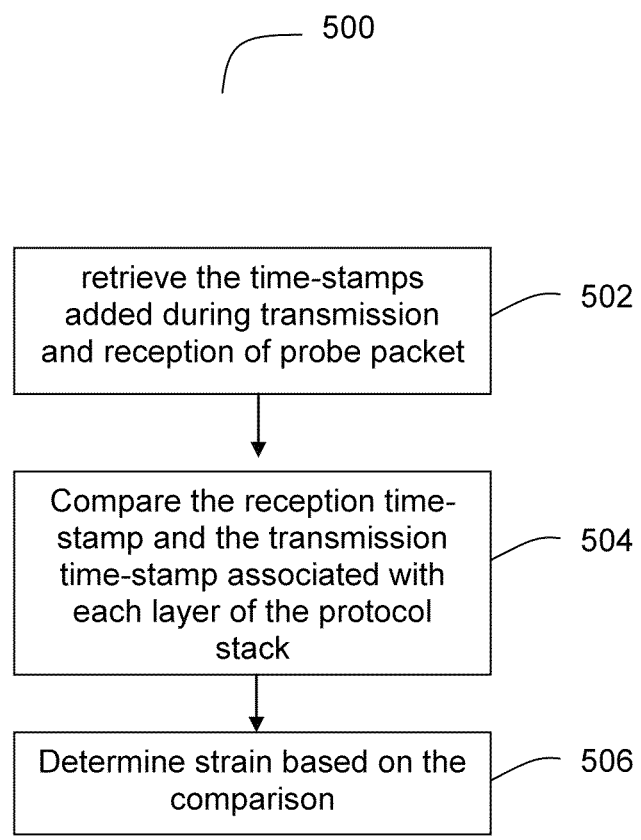
FIG. 5 illustrates a flowchart depicting example operations performed by a central server, according to various aspects of the invention.

FIG. 5 is a flowchart 500 depicting example operations performed by the central server 155, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 5. In yet other implementations, one or more operations may be performed simultaneously. In yet other implementations, one or more operations may not be performed. Accordingly, the operations described are exemplary in nature and, as such, should not be viewed as limiting.

In some implementations, in an operation 502, process 500 may retrieve the transmission time-stamps added at each protocol layer of the IP stack during the transmission of the probe packet. In some implementations, the transmission time-stamps may be retrieved from the probe packets. In some implementations, process 500 may also retrieve the reception time-stamps added at each protocol layer of the IP stack during the reception of the probe packet. In some implementations, process 500 may receive information regarding the probe packets and the response packets. In some implementations, process 500 may retrieve the transmission and reception time-stamps from the information received by the user equipment device 118/128.

In some implementations, process 500 may compare the reception time-stamp and the transmission time-stamp associated with each protocol layer of the IP stack, in an operation 504. In some implementations, process 500 may determine strain associated with each protocol layer based on the comparison, in an operation 506. In other words, process 500 may determine whether a strain is introduced at a particular protocol layer based on the comparison. In some implementations, process 500 may determine whether a particular level of strain was introduced at the physical layer of the IP stack. In some implementations, in response to a determination that the strain was introduced at the physical layer of the IP stack, process 500 may determine that the user equipment device itself has introduced the strain.

In some implementations of the invention, an existing load (i.e., existing packet trains being processed) of a network device (for example, network device 116/126) may be determined before sending new packet trains. In some implementations, the problem with high load on the network device may be handled by detecting high network device load from a user equipment device (for example, user equipment device 118, 128), causing the user equipment device to back off a bit in the sending of new packet trains and/or select another network device to distribute the load. In situations where potentially thousands of user equipment devices may be performing testing/probing for purposes of bandwidth measurement, the network device may get overloaded by such user equipment devices.

In some implementations, user equipment device 118 and/or user equipment device 128 may refrain from sending new packet trains until a previous packet train (i.e., packet train previously sent to the corresponding network device) has been received by the corresponding network device 116/126, unless an expiration timer expires indicating that a time period for receiving the packet train has expired. In some implementations, the timer may be set dynamically, depending on an update rate of bandwidth measurements and/or a history of previously received packet trains. In some implementations, an update rate may refer to the rate at which bandwidth measurements are performed (i.e., a rate at which packet trains are sent for bandwidth measurement purposes).

In some implementations, the user equipment device 118/128 may measure the time that a packet train has been queued (i.e., queue time) on the corresponding network device 116/126 prior to being processed. In some implementations, the user equipment device may determine whether the queue time measurement (also referred to as "queuing delay") associated with the packet train exceeds a queue time threshold. In some implementations, the queue time threshold may be a predefined threshold. In some implementations, the expiration timer may be set based on the queue time measurement.

In some implementations, in response to a determination that the queue time measurement exceeds the queue time threshold, the user equipment device 118/128 may determine that there is high load on the network device 116/126. In response to the determination of high load, the user equipment device 118/128 may select another network device (not otherwise illustrated in the FIGs) to transmit the new packet trains to for bandwidth measurement purposes. In some implementations, in response to the determination of high load, the user equipment device 118/128 may adjust the update rate based on the network device load. In some implementations, the adjustment of the update rate may include decreasing the rate at which bandwidth measurements are performed, which would result in the decrease in the rate at which new packet trains would need to be sent to the network device 116/126 by the user equipment device 118/128.

Figure 6:
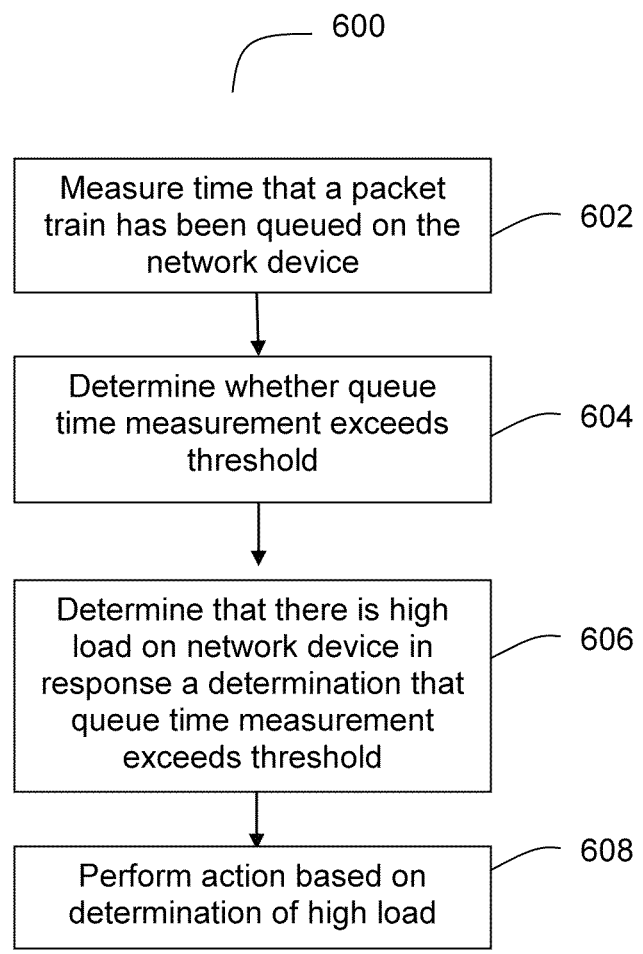
FIG. 6 illustrates a flowchart depicting example operations performed by a user equipment device, according to various aspects of the invention.

FIG. 6 is a flowchart 600 depicting example operations performed by a user equipment device 118 or 128, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 6. In yet other implementations, one or more operations may be performed simultaneously. In yet other implementations, one or more operations may not be performed. Accordingly, the operations described are exemplary in nature and, as such, should not be viewed as limiting.

In some implementations, in an operation 602, process 600 may measure the time that an existing (previously sent) packet train has been queued (i.e., queue time) on a corresponding network device 116 or 126 prior to being processed and prior to sending a new packet train. In some implementations, process 600 may determine whether the queue time measurement associated with the packet train exceeds a queue time threshold, in an operation 604.

In some implementations, in response to a determination that the queue time measurement exceeds the queue time threshold, process 600 may determine that there is high load on the corresponding network device 116 or 126, in an operation 606. In response to the determination of high load, process 600 may perform an action to ease the load on the network device, in operation 608. In some implementations, process 600 may select another network device to transmit the new packet trains to for bandwidth measurement purposes. In some implementations, process 600 may adjust the update rate based on the network device load.

Typically, a packet lost or dropped between the first and the last packet of a packet train, for example, can be readily determined as part of the various standards as would be appreciated. However, overall system performance may be negatively impacted if the last packet is lost. This can be formulated in how to set an appropriate timeout when waiting for the last packet. This applies for both the network device 116/126 waiting for the packets (for example, probe packets associated with the packet train) from the user equipment device 118/128, and the user equipment device 118/128 waiting for the packets (for example, response packets) from the network device 116/126.

In some implementations, user equipment device 118/128 may determine whether a queuing delay (the time that an existing packet train has been queued at the corresponding network device 116/126) depends on the network device load or loss of the last packet associated with the existing packet train. In other words, a determination may be made regarding whether the queuing delay is due to high network device load or loss of the last packet.

In some implementations, network device 116/126 may include information in the response packets (first/second response packets) sent back to the user equipment device 118/128 indicating which of the probe packets were lost in the user equipment device to network device direction. In some implementations, all response packets associated with the packet train may include a bitmap identifying which probe packet(s) in the packet train were lost. For example, first response packets associated with the first packet train may include a bitmap identifying which of the first probe packets were lost. Similarly, second response packets associated with the second packet train may include a bitmap identifying which of the second probe packets were lost. Similarly, user equipment device 118/128 may include information in the probe packets sent to the network device 116/126 indicating which of the response packets were lost in the network device to user equipment device direction. In some implementations, the probe packets sent by the user equipment device 118/128 may include a bitmap identifying which response packet(s) were lost in the network device to user equipment device direction. In some implementations, the bitmap is sent in addition to the TWAMP content of the IP packets. For example, user equipment device 118/128 may provide space for the bitmap in the probe and hence the response packets.

In some implementations of the invention, both the network device 116/126 and the user equipment device 118/128 keep track of the history of packet train arrival times and apply an appropriate timer when waiting for the last packet. If the timer expires, the last packet/packets of the packet train may be considered lost. In some implementations, in response to determination by the network device 116/126 that the last probe packet/packets of the packet train sent by the user equipment device 118/128 is lost, network device 116/126 may send the packet train back to the user equipment device 118/128. In some implementations, the user equipment device 118/128 may initiate a next packet train for transmission in response to an indication from the network device 116/126 that the last probe packet(s) of a previous packet train is lost. In some implementations, in response to determination by the user equipment device 118/128 that the last response packet/packets of the packet train sent by the network device 116/126 is lost, user equipment device 118/128 may send the packet train back to the network device 116/126. In some implementations, the network device 116/126 may initiate a next packet train for transmission in response to an indication from the user equipment device 118/128 that the last response packet(s) of a previous packet train is lost.

In some implementations, based on the determination that a probe packet is lost in the user equipment device to network device direction, a bitmap may be generated by the network device identifying the lost probe packet (for example, lost last probe packet, and/or other lost probe packet(s)). In some implementations, based in the determination that a response packet is lost in the network device to user equipment device direction, a bitmap may be generated (or an existing bitmap updated) by the user equipment device identifying the lost response packet (for example, lost last response packet and/or other lost response packet). In some implementations, user equipment device 118/128 may determine that the queuing delay (the time that a packet train has been queued at the corresponding network device 116/126) depends on loss of the last packet based on the bitmap. In some implementations, a transmission of a new packet train may be initiated in response to a determination that the queuing delay is due to the loss of the last packet.

In some implementations, a recovery mechanism resulting in a slow re-start of packet trains (e.g., starting by a single pair of packet transmissions only) may permit graceful recovery from severe network outage.

Typically, measurements of available bandwidth consider the time between the first and the last packet in the packet train in order to calculate the bit-pipe performance, without considering the initial packet delay (i.e., time from when a packet was sent (initiated) from the user equipment device 118/128 and received by the network device 116/126, or vice versa).

Measuring the available bandwidth over a radio path associated with radio access network 150 may need information about the initial packet delay in order to adapt timers and make the total measurement system more robust. In some implementations, the network device 116/126 and user equipment device 118/128 may use a synchronization method (for example, NTP or other synchronization method), sharing the same time base. In such implementations, the NTP server (not otherwise illustrated in the figures) may be co-located with the network device 116/126 (which may perform the functions of a TWAMP server or reflector). In some implementations, the network device 116/126 and the NTP server may run on the same hardware.

In some implementations, the user equipment device 118/128 may keep track of a transmitting time of a foremost probe packet (e.g. foremost first probe packet/foremost second probe packet) between each packet train and may determine whether there are variations in the receiving time of the first probe packet at the corresponding network device 116/126. In some implementations, the receiving time may be monitored by the user equipment device 118/128 using TWAMP timestamping performed by the network device 116/126. In some implementations, the receiving time may be included in the response packets sent by network device 116/126 to the user equipment device 118/128.

In some implementations, mapping the transmitting time of probe packets initiated from the user equipment device 118/128, via the application layer down to the radio resources (i.e., physical layer) and then comparing the transmitting time with receiving time of the probe packets (indicating relative delays) on the corresponding network device 116/126 makes it possible to measure the initial one way delay. In some implementations, the mapping may associate the transmitting time of the probe packet at each protocol layer with the receiving time of the probe packet at the protocol layer. Since the user equipment device 118/128 and the network device 116/126 share the same time base, each protocol layer (i.e., the timing of the packets at each protocol layer) between the devices may be compared and delays may be removed in other protocol layers.

In some implementations, applying bandwidth measurements using a packet train over a radio access network 150 sets special requirements on the handling of the first few probe/response packets in the packet train. This is due to mechanisms like channel switching and scheduler algorithms (e.g., prioritization and delay in the feedback of channel state information) that may limit the bandwidth during the first few packets.

In some implementations of the invention, in order to handle temporary bottlenecks in the end-to-end bit-pipe (i.e., complete link from the user equipment to the network device), the probe packets (first and/or second probe packets) and/or response packets (first and/or second response packets) received with the actual radio resource used are mapped. The radio resource may be divided in small portions, in time/frequency/code domain (depending on the mobile network technology). Each such portion is uniquely addressable to user equipment devices in the network depending on their needs.

In some implementation, one or more of the probe packets and/or one or more of the response packets affected by channel switching and/or scheduler algorithms are excluded from the measurements of the available bandwidth. This applies both for the user equipment device to network device and network device to user equipment device measurements. In some implementations, a determination may be made (by user equipment device 118/128) as to which of the probe and/or response packets are affected by channel switching and/or scheduler algorithms based on the mapping. In some implementations, the mapping may be made using information from the different protocol layers in the user equipment device and/or network device. In some implementations, the mapping may be performed by a processing device (not otherwise illustrated in the FIGs) of radio access network 150, and/or other processing device of system 100.

Some implementations of the invention may depend on the actual device under test as different services have different packet train patterns which may result in different filtering of initial delay as would be appreciated.

Using the timestamps and sequence numbering, packet loss rate and delay measurement may be obtained. By making use of information in the probe/response packets, it is possible to separate the uplink (user equipment to network device) from the downlink (network device to user equipment) resulting in both downlink and uplink packet loss and trip time measurements. Also, by removing the queue delay in the network device, the effective round trip time may also be determined.

In some implementations, different services may have different types of packet patterns. For example, a file download TCP based service relies on the mechanisms in TCP to constantly load the bit-pipe to the maximum available bandwidth; a speech service typically uses patterns based on small packets at regular intervals; a web browsing session has a short duration of very high load; etc.

In some implementations of the invention, different patterns of packet-trains in combination with different quality of service settings may be used to simulate the behaviour of different services. For example, packet trains carrying voice data may have one type of pattern (low bandwidth, high timing requirements), which is different from a pattern for a best effort service like e-mail that runs in the background on whatever resources are available. In some implementations, the radio access network 150 (i.e., a processing device associated with the radio access network 150, and/or other processing device of system 100) may determine the patterns of the packet trains. Performance measurements such as the resulting jitter, roundtrip and one-way delay, and available bandwidth, may be used to predict end user quality of experience without establishing end-to-end services.

In some implementations of the invention, the available bandwidth measurement implementation has a client side (e.g., user equipment device 118/128) and a server side (e.g., network device 116/126). The probe packets (first and/or second probe packets) that are being transmitted for measurement purposes may also be designed to carry other payload, making it possible to centrally accumulate information carried in the payload.

According to various implementations of the invention, the information carried by the payload may include: 1) current result of the measurements (available bandwidth); 2) network information (e.g. operator, technology, frequency band); 3) positional information (GPS coordinates); 4) other network measurement results such as latency; 5) end user information; 6) device information; 7) application information; and 8) other information capable of being carried as the payload.

In some implementations, network device 116/126 may receive the first and/or second probe packets with the additional payload from the user equipment device 118/128. In some implementations, to benchmark the first and second operators, a common network device (either network device 116 or network device 126) may be accessed by the user equipment devices 118 and 128. In some implementations, the payload data associated with the user equipment devices 118 and 128 may be analyzed by the common network device to benchmark operators and technologies, as well as for finding symptoms of network issues.

In some implementations, in order to ease the identification of probe/response packets in each protocol layer and differentiate them from other traffic, a predefined pattern of packets in the packet trains may be used (by user equipment device 118/128 or network device 116/126). For example, a first packet train may be transmitted with 10 packets, the next nine packet trains with 20 packets, then one packet train with 10 packets, then 9 packet trains with 20 packets, and so on. By transmitting the packets in such a predefined pattern, a sequence of packet trains may be detected in the physical layer (and/or other protocol layer) over time. Thus, packet trains may be differentiated from one another and other traffic.

In some implementations, patterns of different packet size within each packet train may be used to differentiate the packet trains from other traffic. In some implementations, a predefined pattern of packets in the packet trains may be used, wherein instead of keeping the size of each packet at 1500 bytes, one of them at a regular interval may be 1200 bytes, 1000 bytes, or some other size.

In some implementations, the packet trains (packet size, number of packets, and interval) may be adapted and/or tuned to a particular radio bearer configuration by user equipment device 118/128. In other words, a specific packet train may be optimized/tuned for one operator/network and another packet train may be optimized/tuned to a different operator/network. For example, first packet train may be optimized/tuned for the first operator and the second packet train may be optimized/tuned for the second operator. In some implementations, the tuning is performed in terms of number of packets per packet train and/or the number of bytes per packet (i.e. packet size). In some implementations, a given configuration may need to vary over time (e.g., as the user equipment device 118/128 moves from one carrier to another, among different cells, etc.) resulting in cell reselection and even a change of radio access technology (e.g. between a 3G WCDMA and a 4G LTE network). In some implementations, the packet trains are also adapted to account for such semi-static reconfigurations and handle them differently compared to the rapid changes in the cross traffic and changes in the radio environment such as fading and MIMO characteristics.

In some implementations, due to the asymmetric behaviour of mobile networks with different bandwidths in different directions (uplink (user equipment device to network device) vs. downlink (network device to user equipment device), there is a need to scale the load in the uplink relative to the downlink. In typical scenarios, the uplink is more limited than the downlink, however in TDD (time division duplex) networks, the uplink capacity can in some configuration have higher capacity than downlink.

In some implementations, downlink traffic may be scaled compared to the uplink. In some implementations, user equipment device 118/128 may communicate a downlink scaling factor to the corresponding network device 116/126. In some implementations, the downlink scaling factor is sent among the other parameters in the header of the probe packets to the network device (an extension of the existing header (e.g. the existing TWAMP header). In some implementations, network device 116/126 may communicate an uplink scaling factor to the corresponding user equipment device 118/128. In some implementations, the uplink scaling factor is sent among the other parameters in the header of the response packets to the user equipment device. In some implementations, the uplink scaling factor and downlink scaling factor may indicate an up-scaling and a downscaling, respectively, of the packet size and number of packets.

In some implementations, central server 155 may include a processor, a memory, and/or other components (not otherwise illustrated in the figures) that facilitate the functions of central server 155. In some implementations, the processor includes one or more processors/microprocessors configured to perform various functions of central server 155. In some implementations, the memory includes one or more tangible (i.e., non-transitory) computer readable media. The memory may include one or more instructions that when executed by the processor configure the processor to perform functions of central server 155. In some implementations, the memory may include one or more instructions stored on tangible computer readable media that when executed at a remote device, such as user equipment 118/128, cause the remote device to facilitate interaction with the central server, as described herein.

In some implementations, radio access network 150 may include an LTE based radio access network with 20 MHz bandwidth using user equipment (for example, first and/or second user equipment 118, 128) which may include a category 3 device. Such a system may have 100 MBit/s as the maximum available bandwidth. In some implementations, the maximum achievable downlink throughout for the system in clean radio conditions is 100 Mbit/s on the physical layer.

In order to fully load the bit-pipe and be able to attain the maximum throughput rate, 100 kbit is transmitted in each TTI (transmission time interval), since the TTI length in LTE is 1 ms. In some implementations, 60 packets each of size 1,500 bytes on the application layer may be sent by the network device 116/126 to the user equipment device 118/128, resulting in about 750,000 bits in total on the physical layer.

Assuming that the network's full capacity is available for the available bandwidth measurement, the measurement may be performed in about 8 ms, which means that the level of intrusiveness for downlink (i.e., the fraction of time occupied by the available bandwidth measurement) is as low as 1.5%.

The uplink in this configuration may have a maximum throughput of approximately half of the downlink, or 50 Mbit/s. Consequently, when performing available bandwidth measurement on the uplink, using the same packet train, the level of intrusiveness for uplink may be approximately twice as high as the level of intrusiveness for the downlink, for example, 3%.

Because the scheduler operates on a 1 ms basis, loading the system less than 100 kbit (per packet-train) does not overload the bit-pipe and hence, makes it impossible to fill and consequently to measure the available bandwidth. However, due to quantization effects of the IP packets segmented into radio blocks, there is a need to connect the resource block scheduling over the physical interface to the IP packets in order not to count for such quantization effects.

Figure 8:
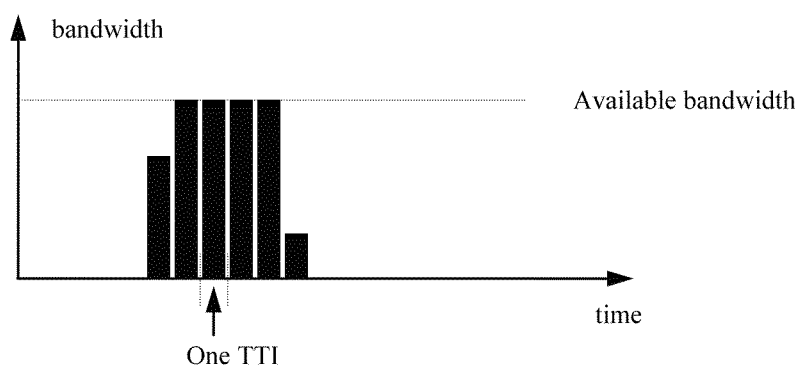
FIG. 8 illustrates a distribution of one packet train across TTIs, according to various aspects of the invention.

To safeguard measurement accuracy, a sequence of packets may be sent that are contiguous in time rather than a single packet. This is because if only one packet is sent, it would most likely not fill up one TTI, or it would be scheduled across two TTIs, which means that the full available bandwidth would not be utilized in any TTI. On the other hand with multiple packets sent back-to-back and scheduled in consecutive TTIs, it may be ensured that the network's full available capacity is allotted to the available bandwidth measurement for at least some TTIs in the middle of the packet train. FIG. 8 illustrates a distribution of one packet train across TTIs, for example. The bandwidth allocated to other users is not represented in this figure and clean radio conditions are assumed. It may be seen that at the beginning and end of the packet train, the transmission is not competing for the while TTI.

In some implementations, the number of packets in a packet train as well as the packet size may be variable, and the instantaneous data rate may be chosen to correspond to the maximum bandwidth according to the current system information parameters, user equipment capabilities, and other settings. The amount of data sent (via packet trains) is adjusted according to the network's maximum throughput while keeping the level of intrusiveness at a minimum. As described above, the packet trains (i.e., amount of data sent for performing available bandwidth measurement) may be adapted and/or tuned to a particular radio bearer configuration by user equipment device 118/128.

In some implementations, FIGS. 10A-10F illustrate a number of tables depicting the traffic patterns and performance metrics associated with available bandwidth measurement (ABM) for different radio access network technologies (i.e., different implementations for radio access network 150). In some implementations, the central server 155 may perform various measurements and determine the performance metrics for one or more technologies. For example, FIGS. 10A-10F illustrate performance metrics associated with LTE (Long Term Evolution), HSPA (High Speed Packet Access), R99 (Release 99 for Universal Mobile Telecommunications System), GPRS (General Packet Radio Service), EGPRS (Enhanced GPRS), CDMA (Code Division Multiple Access), EVDO (Evolution Data Optimized), and WiFi technologies.

In some implementations, central server 155 may, for example, may determine various performance metrics for an LTE based radio access network with 20 MHz bandwidth using a category 3 user equipment device (i.e., for example, radio access network 150 may be an LTE based radio access network and user equipment devices 118, 128 may be category 3 user equipment devices). Assuming that the bits per TTI is 102048, TTIs per second is 1000, the number of packets per packet train is 58, the packet trains per second is 2, and the IP packet size is 1500 bits (see FIG. 9 which depicts traffic patterns for a number of different technologies), various downlink performance metrics may be determined as follows:

In some implementations, central server 155 may determine a link capacity for the physical layer ($LinkCapacity_{PL}$) in bits/second based on the following equation:

$$LinkCapacity_{PL} = \text{bits per TTI} * \text{TTIs per second} \qquad (1)$$

For example, based on equation (1), the $LinkCapacity_{PL}$ for the LTE based radio access network with 20 MHz bandwidth using a category 3 user equipment device is 102048*1000=102048000.

In some implementations, central server 155 may determine a link capacity for the application layer ($LinkCapacity_{AL}$) in bits/second based on the following equation:

$$LinkCapacity_{AL} = \frac{LinkCapacityPL}{kPLAL}, \qquad (2)$$

where kPLAL is the relative protocol overhead factor which may be determined by analyzing the overhead between the protocol layers.

In some implementations, the $LinkCapacity_{AL}$ may also be referred to as the application layer throughput.

For example, based on equation (2), the $LinkCapacity_{AL}$ for the LTE based radio access network with 20 MHz bandwidth using a category 3 user equipment device is 102048000/1.072671267=95134458.37, where the value for kPLAL is determined to be 1.072671267 for this LTE configuration.

In some implementations, central server 155 may determine the bits per train (BPT) based on the following equation:

$$BPT = \text{IP packet size} * \text{packets per train} * 8 \qquad (3)$$

For example, based on equation (3), the BPT for the LTE based radio access network with 20 MHz bandwidth using a category 3 user equipment device is 1500*58*8=696000.

In some implementations, central server 155 may determine the overhead percentage based on the following equation:

$$\text{Overhead \%} = (kPLAL-1)/100 \qquad (4)$$

For example, based on equation (4), the Overhead % for the LTE based radio access network with 20 MHz bandwidth using a category 3 user equipment device is (1.072671267−1)/100=7.2671267. In some implementations, the overhead percentage may be dependant on the type and configuration of the radio access network.

In some implementations, central server 155 may determine the physical layer load per train (PLLB) in bits based on the following equation:

$$PLLB = BPT * kPLAL \tag{5}$$

For example, based on equation (5), the PLLB for the LTE based radio access network with 20 MHz bandwidth using a category 3 user equipment device is 696000*1.072671267=746579.2019.

In some implementations, central server 155 may determine the physical layer load ($PLL_{KB}$) in kbits/second based on the following equation:

$$PLL_{KB} = \frac{PLLB * \text{trains per second}}{1000} \tag{6}$$

For example, based on equation (6), the $PLL_{KB}$ for the LTE based radio access network with 20 MHz bandwidth using a category 3 user equipment device is 746579.2019*2/1000=1493.158404.

In some implementations, central server 155 may determine the level of intrusiveness percentage based on the following equation:

$$LOI \% = \frac{\text{trains per second} * PLLB}{LinkCapacityPL} * 100 \tag{7}$$

For example, based on equation (7), the LOI % for the LTE based radio access network with 20 MHz bandwidth using a category 3 user equipment device is (2*746579.2019/102048000)*100=1.463192227.

In some implementations, the level of intrusiveness may be the total bandwidth consumed by the probe packets on the physical layer divided by the total capacity of the radio link on the physical layer.

In some implementations, central server 155 may determine the ceiling of TTIs per train (CTTI) based on the following equation:

$$CTTI = CEILING(PLLB/\text{bits per TTI}, 1) \tag{8}$$

For example, based on equation (8), the CTTI for the LTE based radio access network with 20 MHz bandwidth using a category 3 user equipment device is Ceiling (746579.2019/102048, 1), i.e., Ceiling (7.3159, 1)=8.

In some implementations, central server 155 may determine TTIs per train+1 based on the following equation:

$$\text{TTIs per train}+1 = CTTI+1 \tag{9}$$

In some implementations, central server 155 may determine TTIs per train−1 based on the following equation:

$$\text{TTIs per train}-1 = CTTI-1 \tag{10}$$

In some implementations, central server 155 may determine the ABM (available bandwidth measurement) throughput (ABMT) based on the following equation:

$$ABMT = \frac{BPT}{CTTI} * TTI \text{ per second} \tag{11}$$

For example, based on equation (11), the ABMT for the LTE based radio access network with 20 MHz bandwidth using a category 3 user equipment device is (696000/8)*1000=87000000.

In some implementations, central server 155 may determine the ABM error percentage (ABME %) based on the following equation:

$$ABME \% = \frac{ABMT - LinkCapacityAL}{LinkCapacityAL} * 100 \tag{12}$$

For example, based on equation (12), the ABME % (i.e., relative accuracy of measurement) for the LTE based radio access network with 20 MHz bandwidth using a category 3 user equipment device is (87000000−95134458.37)/95134458.37*100=−8.550485812.

In some implementations, equation (12) may be used when there is no traffic in the link. Otherwise, the equation used to determine ABME % would be $$\frac{ABMT - AvailableLinkCapacityAL}{LinkCapacityAL} * 100,$$

where AvailableLinkCapacityAL is the true available link capacity on the application layer.

In some implementations, central server 155 may determine the maximum ABM throughput (MAX:ABMT) based on the following equation:

$$MAX{:}ABMT = \frac{BPT}{TTIs \text{ per train} - 1} * TTI \text{ per second} \tag{13}$$

For example, based on equation (13), the MAX:ABMT for the LTE based radio access network with 20 MHz bandwidth using a category 3 user equipment device is 696000/7*1000=99428571.43.

In some implementations, central server 155 may determine the maximum ABM error percentage (MAX:ABME %) based on the following equation:

$$MAX{:}ABME \% = \frac{MAX{:}ABMT - LinkCapacityAL}{LinkCapacityAL} * 100 \tag{14}$$

For example, based on equation (14), the MAX:ABME % for the LTE based radio access network with 20 MHz bandwidth using a category 3 user equipment device is (99428571.43−95134458.37)/95134458.37*100=4.5137305.

In some implementations, central server 155 may determine the accuracy percentage (accuracy %) based on the following equation:

$$\text{Accuracy } \% = 100 - MAX{:}ABME \% \tag{15}$$

For example, based on equation (15), the accuracy % for the LTE based radio access network with 20 MHz bandwidth using a category 3 user equipment device is 100−4.5137305=95.4862695.

While the various performance metrics, equations and calculations above have been described for the downlink direction of the LTE based radio access network with 20 MHz bandwidth using a category 3 user equipment device (the various values are depicted under the "LTE 20 MHz 2TB UE Category 3 (DL)" column heading of FIG. 10A, for example), the above-mentioned equations and calculations may be used by the central server 155 to determine various downlink (DL) and uplink (UL) performance metrics for different types and variations of technologies, as depicted in FIGS. 10A-10F, without departing from the scope of the invention. Also, while the various performance metrics, equations, and calculations have been described as being performed by central server 155, these measurements may be performed by the user equipment devices 118 and/or 128, without departing from the scope of the invention.

In some implementations, FIG. 11A summarizes the performance metrics for available bandwidth measurement associated with various technologies based on the measurements of FIGS. 10A-10F. For example, for an LTE based radio access network with 20 MHz bandwidth using a category 3 user equipment device, the number of packets in the packet train is 58, the level of intrusiveness for downlink (DL) is approximately 1.5%, the level of intrusiveness for uplink (UL) is approximately 3%, and the MAX:ABME % is approximately 4.5%.

In some implementations, FIG. 11B summarizes the typical and worst case LOI %, and the typical and worst case accuracy % across various variations of technologies depicted in FIGS. 10A-10F. For example, for various variations of the LTE based radio access network technology (depicted in FIGS. 10A and 10B, for example), the typical LOI % is approximately 2.034497498, the worst case LOI % is 8.143315902, the typical accuracy % is 98.27512509 and the worst case accuracy % is 95.4862695.

Figure 12:
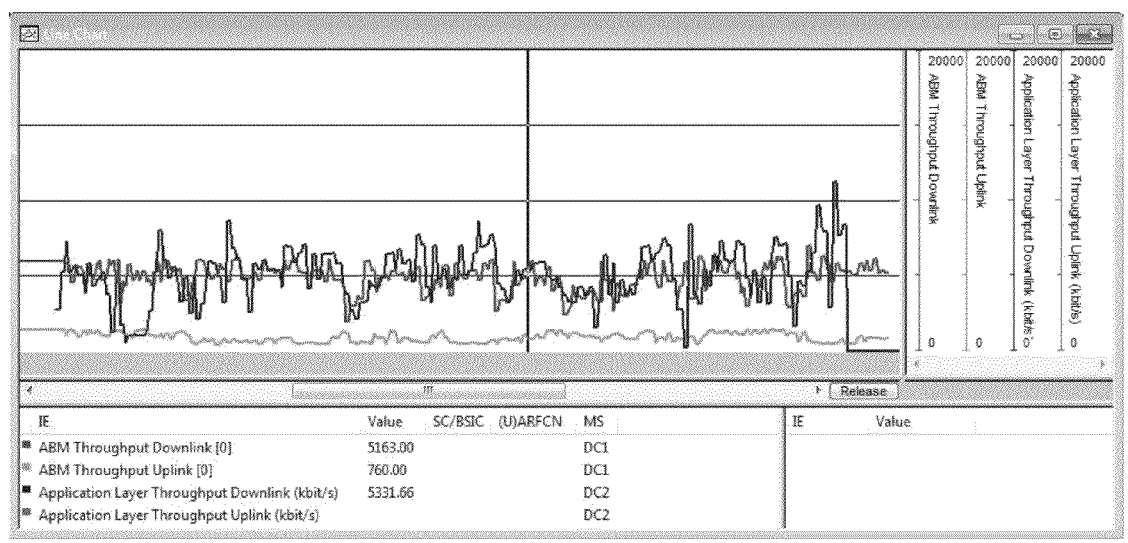
FIG. 12 illustrates a plot depicting the ABM throughput and application layer throughput for the downlink and uplink directions, according to various aspects of the invention.

In some implementations, FIG. 12 illustrates a plot depicting the ABM throughput in the downlink direction, the ABM throughput in the uplink direction, the application layer throughput (LinkCapacity$_{AL}$) in the downlink direction (in kbits/second) and the application layer throughput (LinkCapacity$_{AL}$) in the uplink direction (in kbits/second).

In some implementations, two user equipment devices may be connected to the same cell in the radio access network. One user equipment device may perform an FTP download and may measure the throughput. The other user equipment device may perform the various ABM measurements described herein.

In some implementations, the FTP transfer and the packet data associated with the ABM measurements do not compete for capacity. Instead, the available bandwidth is limited by the radio environment, which is similar for both the user equipment devices. Thus, the FTP throughput and the ABM measurement (for example, ABM throughput) may be expected to correlate, which is shown in FIG. 12. As such, FIG. 12 demonstrates that the ABM measurements provide a similar throughput measure as the FTP throughput.

According to various aspects of the invention, the available bandwidth measurement describe above may be performed with minimum impact on the shared radio resource (i.e., shared radio access network 150) and adapts to the fast varying radio environment (e.g., adapts to the channel rank controlling the usage of MIMO or other channel state information measured by the user equipment and reported to the network).

Implementations of the invention may be made in hardware, firmware, software, or various combinations thereof. The invention may also be implemented as computer-readable instructions stored on a non-transitory/tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for performing an available bandwidth measurement in a wireless network, the method comprising:
receiving information associated with a packet train transmitted between a user equipment device and a network device operating within the wireless network;
determining bits in the packet train (BPT);
determining an available bandwidth measurement throughput (ABMT) of the wireless network based on the equation:

$$ABMT = \frac{BPT}{CTTI} * TTI \text{ per second,}$$

wherein CTTI is an integer number representing the ceiling of the number of TTIs (transmission time intervals) needed per packet train.

2. The method of claim 1, wherein determining BPT further comprises:
determining BPT based on the packet size associated with the packet train and a number of packets in the packet train.

3. The method of claim 1, wherein CTTI is determined based on the physical layer load per packet train.

4. The method of claim 1, further comprising:
determining a maximum available bandwidth measurement throughput (MAX:ABMT) based on the equation:

$$MAX{:}ABMT = \frac{BPT}{TTIs \text{ per train} - 1} * TTI \text{ per second.}$$

5. The method of claim 4, further comprising:
determining a maximum available bandwidth measurement error percentage (MAX:ABME %) based on the equation:

$$MAX{:}ABME\% = \frac{MAX{:}ABMT - LinkCapacityAL}{LinkCapacityAL} * 100,$$

wherein LinkCapacity$_{AL}$ is a link capacity for an application layer.

6. The method of claim 1, wherein the ABMT is determined for an uplink direction and a downlink direction.

7. A system for performing an available bandwidth measurement in a wireless network, the system comprising:
a processing device comprising one or more processors configured to:
receive information associated with a packet train transmitted between a user equipment device and a network device operating within the wireless network;
determine bits in the packet train (BPT);
determine an available bandwidth measurement throughput (ABMT) of the wireless network based on the equation:

$$ABMT = \frac{BPT}{CTTI} * TTI \text{ per second,}$$

wherein CTTI is an integer number representing the ceiling of the number of TTIs (transmission time intervals) needed per packet train.

8. The system of claim 7, wherein the one or more processors configured to determine BPT are further configured to:
determine BPT based on the packet size associated with the packet train and a number of packets in the packet train.

9. The system of claim 7, wherein CTTI is determined based on the physical layer load per packet train.

10. The system of claim 7, wherein the one or more processors are further configured to:
determine a maximum available bandwidth measurement throughput (MAX:ABMT) based on the equation:

$$MAX{:}ABMT = \frac{BPT}{TTIs \text{ per train} - 1} * TTI \text{ per second.}$$

11. The system of claim 10, wherein the one or more processors are further configured to:
determine a maximum available bandwidth measurement error percentage (MAX:ABME %) based on the equation:

$$MAX{:}ABME\% = \frac{MAX{:}ABMT - LinkCapacityAL}{LinkCapacityAL} * 100,$$

wherein LinkCapacity$_{AL}$ is a link capacity for an application layer.

12. The system of claim 7, wherein the ABMT is determined for an uplink direction and a downlink direction.

13. A non-transitory computer readable storage medium having one or more computer-readable instructions thereon which when executed by one or more processors cause the one or more processors to:
receive information associated with a packet train transmitted between a user equipment device and a network device operating within a wireless network;
determine bits in the packet train (BPT);
determine an available bandwidth measurement throughput (ABMT) of the wireless network based on the equation:

$$ABMT = \frac{BPT}{CTTI} * TTI \text{ per second,}$$

wherein CTTI is an integer number representing the ceiling of the number of TTIs (transmission time intervals) needed per packet train.

14. The non-transitory computer readable storage medium of claim 13, wherein the instructions causing the one or more processors to determine BPT are further configured to:
determine BPT based on the packet size associated with the packet train and a number of packets in the packet train.

15. The non-transitory computer readable storage medium of claim 13, wherein CTTI is determined based on the physical layer load per packet train.

16. The non-transitory computer readable storage medium of claim 13, wherein the instructions further cause the one or more processors to:
   determine a maximum available bandwidth measurement throughput (MAX:ABMT) based on the equation:

$$MAX:ABMT = \frac{BPT}{TTIs \text{ per train} - 1} * TTI \text{ per second.}$$

17. The non-transitory computer readable storage medium of claim 16, wherein the instructions further cause the one or more processors to:
   determine a maximum available bandwidth measurement error percentage (MAX:ABME %) based on the equation:

$$MAX:ABME\% = \frac{MAX:ABMT - LinkCapacityAL}{LinkCapacityAL} * 100,$$

wherein $LinkCapacity_{AL}$ is a link capacity for an application layer.

18. The non-transitory computer readable storage medium of claim 13, wherein the ABMT is determined for an uplink direction and a downlink direction.

\* \* \* \* \*